United States Patent
Kamura et al.

[19]

[11] Patent Number: 5,975,044
[45] Date of Patent: Nov. 2, 1999

[54] CONTROL APPARATUS FOR CYLINDER FUEL INJECTION INTERNAL COMBUSTION ENGINES

[75] Inventors: Hitoshi Kamura; Kenjiro Hatayama; Atsuyoshi Kojima; Hiroki Tamura, all of Tokyo, Japan

[73] Assignee: Mitsubishi Jidosha Kogyo Kabushiki Kaisha, Tokyo, Japan

[21] Appl. No.: 09/066,437

[22] PCT Filed: Apr. 24, 1997

[86] PCT No.: PCT/JP97/01441

§ 371 Date: Apr. 28, 1998

§ 102(e) Date: Apr. 28, 1998

[87] PCT Pub. No.: WO98/09063

PCT Pub. Date: Mar. 5, 1998

[30] Foreign Application Priority Data

Aug. 28, 1996 [JP] Japan .................................. 8-227219

[51] Int. Cl.[6] .................................................... F02B 17/00
[52] U.S. Cl. ............................................................ 123/295
[58] Field of Search .............................. 123/295, 339.16

[56] References Cited

U.S. PATENT DOCUMENTS

| | | | |
|---|---|---|---|
| 4,616,621 | 10/1986 | Kuroiwa et al. | 123/585 |
| 5,797,367 | 8/1998 | Iida et al. | 123/295 |
| 5,823,160 | 10/1998 | Oda et al. | 123/295 |
| 5,826,559 | 10/1998 | Ichimoto et al. | 123/295 |
| 5,875,756 | 3/1999 | Kamura et al. | 123/295 |
| 5,878,711 | 3/1999 | Kamura et al. | 123/295 |

FOREIGN PATENT DOCUMENTS

| | | |
|---|---|---|
| 59-70853 | 4/1984 | Japan . |
| 2-146239 | 6/1990 | Japan . |
| 3-78544 | 4/1991 | Japan . |
| 4-41953 | 2/1992 | Japan . |
| 4-325717 | 11/1992 | Japan . |
| 5-79370 | 3/1993 | Japan . |
| 5-272387 | 10/1993 | Japan . |
| 8-144821 | 6/1996 | Japan . |
| 8-200133 | 8/1996 | Japan . |

*Primary Examiner*—Erick R. Solis

[57] ABSTRACT

A control apparatus for a cylinder fuel injection internal combustion engine in which a compression stroke injection mode for carrying out fuel injection mainly in a compression stroke and a suction stroke injection mode for carrying out fuel injection mainly in a suction stroke can be selected in accordance with the operational condition of the engine. The apparatus aiming at enabling a suitable suction correcting amount to be set for each operational mode of the engine and the improvement of drivability thereby being improved.

19 Claims, 6 Drawing Sheets

FIG. 3(A) A/C
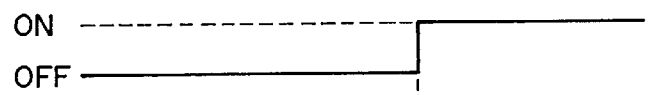
FIG. 3(B) ENGINE ROTATIONAL SPEED
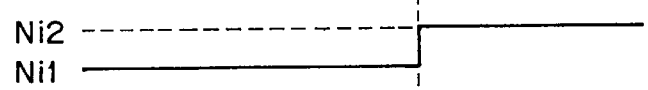
FIG. 3(C) INTAKE AMOUNT
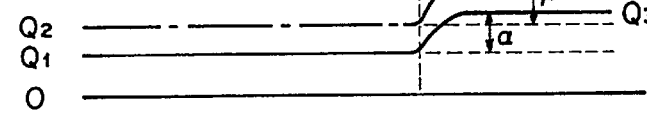

CONTROL APPARATUS FOR CYLINDER FUEL INJECTION INTERNAL COMBUSTION ENGINES

This application claims the benefit under 35 U.S.C. § 371 of prior PCT International Application No. PCT/JP97/01441, which has an International filing date of Apr. 24, 1997, which designated the United States of America, the entire contents of which are hereby incorporated by references.

BACKGROUND OF THE INVENTION

1. Field of the Invention

This invention relates to a control unit for in-cylinder injection internal combustion engine which can select, according to an engine operation state, a compression stroke injection mode for mainly injecting fuel at a compression stroke and an intake stroke injection mode for mainly injecting fuel at an intake stroke; and, in particular, to a control unit for in-cylinder injection internal combustion engine which can optimally correct an intake amount.

2. Background Art

A throttle valve is installed in an intake passage of an engine such as an internal combustion engine. There has been developed a configuration of an intake system in which a bypass passage bypassing the throttle-valve-installed portion is formed such that its both end portions communicate with the intake passage, and the bypass passage is equipped with a bypass valve.

Commonly employed as such a bypass valve is, for example, a bypass valve for idle speed control which is used for adjusting the intake amount so that the engine can maintain a predetermined idling rotational speed.

Independently of a throttle valve whose opening degree is adjusted in response to a driver's operation for stepping on an accelerator pedal, the opening degree of the idle speed control bypass valve is appropriately adjusted, while feeding back the engine rotational speed, in order to keep the engine rotational speed at a predetermined idle rotational speed, and independently of the driver's accelerator pedal operation, the intake amount is adjusted so as to maintain the idle rotational speed.

Also, there has been developed a configuration of an intake system in which, separately from the bypass passage for idle speed control and the bypass valve, a bypass passage for bypassing the throttle-valve-installed portion of the intake passage is formed so as to be used for controlling the air/fuel ratio of the air/fuel mixture supplied to a combustion chamber not only upon idling, and this bypass passage is equipped with a bypass valve [which is referred to as air bypass valve (ABV)].

Such an air bypass valve can control not only idle speed but also other engine operation states by adjusting the intake amount independently of the throttle valve that is adjusted upon the driver's accelerator pedal operation.

In any case, the opening degree of these bypass valve is appropriately controlled according to the engine operation state or the like, independently of the throttle valve that is adjusted by the driver's accelerator pedal operation.

Also, when the idle speed is to be controlled by such a bypass valve, a target engine rotational speed is set according to cooling water temperature, air conditioner state, shift lever position (in the case of automatic transmission), or the like, and while an actual engine rotational speed is being detected, the opening degree of the bypass valve is adjusted so that the actual engine rotational speed coincides with the target engine rotational speed.

When the bypass valve is used for the purpose other than idle speed control, by contrast, an air amount (intake correction amount) to be taken in by the bypass valve is set according to the engine operation state, and the opening of the bypass valve is adjusted to such a degree that this air amount is attained. In this case, a relationship between the engine operation state and its corresponding intake correction amount or valve opening degree may be mapped, for example, and the intake correction amount or valve opening degree is set while the engine operation state is caused to correspond to this relationship (map).

Further, there is a technique in which a motor-driven throttle valve is provided such that the throttle valve is driven by a motor, while a target opening degree of the throttle valve is set on the basis of various correction coefficients set according to the accelerator opening degree and operation state, thus allowing intake adjustment to be effected without using a bypass valve or the like.

Meanwhile, recently under development are lean-burn engines which perform a burn operation in a fuel-lean air/fuel ratio state. Widely used in such a lean-burn engine is a multi point injection (MPI) type engine in which intake ports of individual cylinders are provided with respective fuel injection valves, since it can control the fuel injection amount in each cylinder and thus has a good controllability. In a recently-developed in-cylinder injection engine (in-cylinder injection internal combustion engine) in which a fuel injection valve is disposed so as to directly inject fuel into a combustion chamber within a cylinder, an ultra lean burn operation, in which a burn operation is performed in a further fuel-lean air/fuel ratio state, can be effected.

Namely, since fuel can be injected into the combustion chamber in such an in-cylinder injection engine at any time regardless of opening and closing of the intake valve, various operations, including the ultra lean burn operation, can be performed as explained in the following.

For example, a fuel injection mode based on a compression stroke (referred to as compression stroke injection mode) can be set. In this compression stroke injection mode, stable burning can be realized in an ultra lean air/fuel ratio state due to stratified combustion utilizing a stratified intake flow formed within the cylinder. Namely, since the injected fuel can be concentrated in the vicinity of a spark plug; while only the vicinity of the spark plug attains a stable ignition performance as an air/fuel ratio state with good ignitability (i.e., state at a stoichiometric air/fuel ratio or an air/fuel ratio in which fuel is somewhat richer than that in the stoichiometric air/fuel ratio), an ultra-lean air/fuel ratio state is attained as a whole so as to enable driving while greatly saving fuel consumption.

Of course, a fuel injection mode based on an intake stroke (referred to as intake stroke fuel injection mode) can be set. In this intake stroke fuel injection mode, while the air/fuel ratio state of the whole combustion chamber is being homogenized by premixing the fuel, operation can be performed so as to realize stable ignition and secure flame propagation, thereby attaining a sufficiently high output. Adopted as this intake stroke injection mode are a stoichiometric mode for attaining a higher output while adjusting the air/fuel ratio to the vicinity of a stoichiometric air/fuel ratio and a lean mode for setting the air/fuel ratio leaner than the stoichiometric air/fuel ratio whereby the fuel consumption can be saved. Also, in view of the case where a high output is temporarily required upon sudden acceleration or the like, adopted is an enriched mode in which the air/fuel ratio is made richer than the stoichiometric air/fuel ratio.

Such an in-cylinder injection engine is operated while individual operation modes such as the above-mentioned compression stroke injection mode (compressed lean mode or later lean mode), intake stroke injection stoichiometric mode (stoichiometric mode), intake stroke injection lean mode (intake lean mode or earlier leanmode), intake stroke injection enriched mode (enriched mode), and the like are appropriately selected. These operation modes are considered to be selected according to engine rotational speed and engine load.

Namely, the compressed lean mode is selected in a region where both engine rotational speed and engine load are low; whereas, as the engine rotational speed or engine load increases therefrom, the intake lean mode, stoichiometric mode, and enriched mode are successively selected in response to the magnitude of increase.

Since the amount of stepping on the accelerator pedal substantially corresponds to the engine load; when the compressed lean mode is selected, the accelerator pedal stepping amount is small, whereby the opening degree of the throttle valve is small. In the compressed lean mode where operation is effected in an ultra lean state with a very high air/fuel ratio, by contrast, unless a sufficient amount of intake air is provided, the stratified flow is weakened, thereby making it difficult to effect stable burning. Accordingly, when the throttle valve opening is small and the intake air amount is restricted, it becomes difficult to effect operation in the compressed lean mode.

Therefore, in the in-cylinder injection engine, as mentioned above, a bypass passage (air bypass passage) bypassing the throttle valve is formed, and the intake amount correction is performed so as to compensate for the air amount restricted by the throttle valve, while controlling a valve (air bypass valve) attached to the air bypass passage.

Meanwhile, in such an in-cylinder injection engine, among the operation modes, the air/fuel ratio to be controlled varies, and the fuel injection stroke changes, whereby the amount of intake required for obtaining the same torque differs among the operation modes, and the intake vacuum for obtaining the same torque differs among the operation modes as well.

Since the intake vacuum for obtaining the same torque differs among the operation modes, when the relationship between the engine operation state and the intake correction amount or valve opening degree is uniformly set as mentioned above, for example, an optimal intake correction amount cannot be set for each operation mode, thereby deteriorating drivability.

In view of the problems mentioned above, it is an object of the present invention to provide a control unit for an in-cylinder injection combustion engine, which can set an appropriate intake correction amount for each operation mode in the in-cylinder injection internal combustion engine in order to improve the drivability in the in-cylinder injection internal combustion engine.

DISCLOSURE OF THE INVENTION

To this end, the present invention provides a control unit for an in-cylinder injection internal combustion engine in which fuel is directly injected into a combustion chamber and is adapted to select, according to an operation state of the internal combustion engine, a compression stroke injection mode for mainly injecting fuel at a compression stroke and an intake stroke injection mode for mainly injecting fuel at an intake stroke; the control unit comprising operation state detecting means for detecting an operation state or operation environmental state of the internal combustion engine, intake amount correcting means for changing an amount of intake supplied to the internal combustion engine, intake correction amount setting means for setting, according to a predetermined relationship, the intake correction amount according to the operation state detected by the operation state detecting means, and intake amount correction control means for controlling operation of the intake amount correcting means according to the intake correction amount set by the intake correction amount setting means, wherein the relationship between the operation state and the intake correction amount is set differently between the compression stroke injection mode and the intake stroke injection mode.

Owing to this configuration, the intake amount can be appropriately corrected for each of the operation modes such as compression stroke injection mode and intake stroke injection mode in the in-cylinder injection internal combustion engine, thus allowing drivability to improve in the in-cylinder injection internal combustion engine.

Preferably, the intake amount correction control means is configured so as to correct, upon an idling operation of the internal combustion engine, the intake amount according to the above-mentioned relationship between the operation state and the intake correction amount, while the relationship between the operation state and the intake correction amount used upon the idling operation is set differently between the compression stroke injection mode and the intake stroke injection mode.

Consequently, in particular, the intake amount can be appropriately corrected upon the idling operation where intake amount correction becomes important, thus allowing the drivability in the in-cylinder injection internal combustion engine to efficiently improve.

It is preferable that the intake amount in the compression stroke injection mode when the internal combustion engine is idling be set greater than the intake amount in the intake stroke injection mode when the internal combustion engine is idling.

Preferably, the internal combustion engine further comprises target air/fuel ratio setting means for setting a target air/fuel ratio according to a result of detection of the operation state detecting means, and the target air/fuel ratio set in the compression stroke injection mode is leaner than the target air/fuel ratio set in the intake stroke injection mode.

Specifically, as the operation state detecting means, the one detecting a rotational speed of the internal combustion engine, the one detecting an accelerator operation state, the one detecting an opening degree of an intake throttle valve, the one detecting a shift state of a transmission coupled to the internal combustion engine, the one detecting an atmospheric pressure, the one detecting operaation state of an accessory directly or indirectly driven by the internal combustion engine, or the one detecting a substantially full close state of the intake throttle valve can be used.

Preferably, the intake correction means corrects a bypass air amount of the intake throttle valve.

Preferably, the internal combustion engine comprises an electrically-driven intake throttle valve, and the intake amount correcting means corrects an opening degree of the intake throttle valve.

Preferably, the operation state is a state of load applied to the internal combustion engine, and the intake correction amount is set in correlation with an intake opening area which is adjusted in accordance with the state of load.

In this case, it is preferred that an amount of change in the intake correction amount with respect to a change in the intake opening area be set greater in the compression stroke injection mode than in the intake stroke injection mode.

BRIEF DESCRIPTION OF THE DRAWINGS

FIG. 3 is a view for explaining an intake correction amount setting characteristic in the control unit for in-cylinder injection internal combustion engine as an embodiment of the present invention;

BEST MODES FOR CARRYING OUT THE INVENTION

With reference to the drawings, a description will hereinafter be made about modes for carrying out the present invention. Namely, the explanation will be made with reference to FIGS. 1 to 6 which illustrate a control unit for in-cylinder injection internal combustion engine as an embodiment of the present invention.

First, the configuration of the in-cylinder injection internal combustion engine (hereinafter referred to as in-cylinder injection engine) will be explained with reference to FIG. 4.

Figure 4:
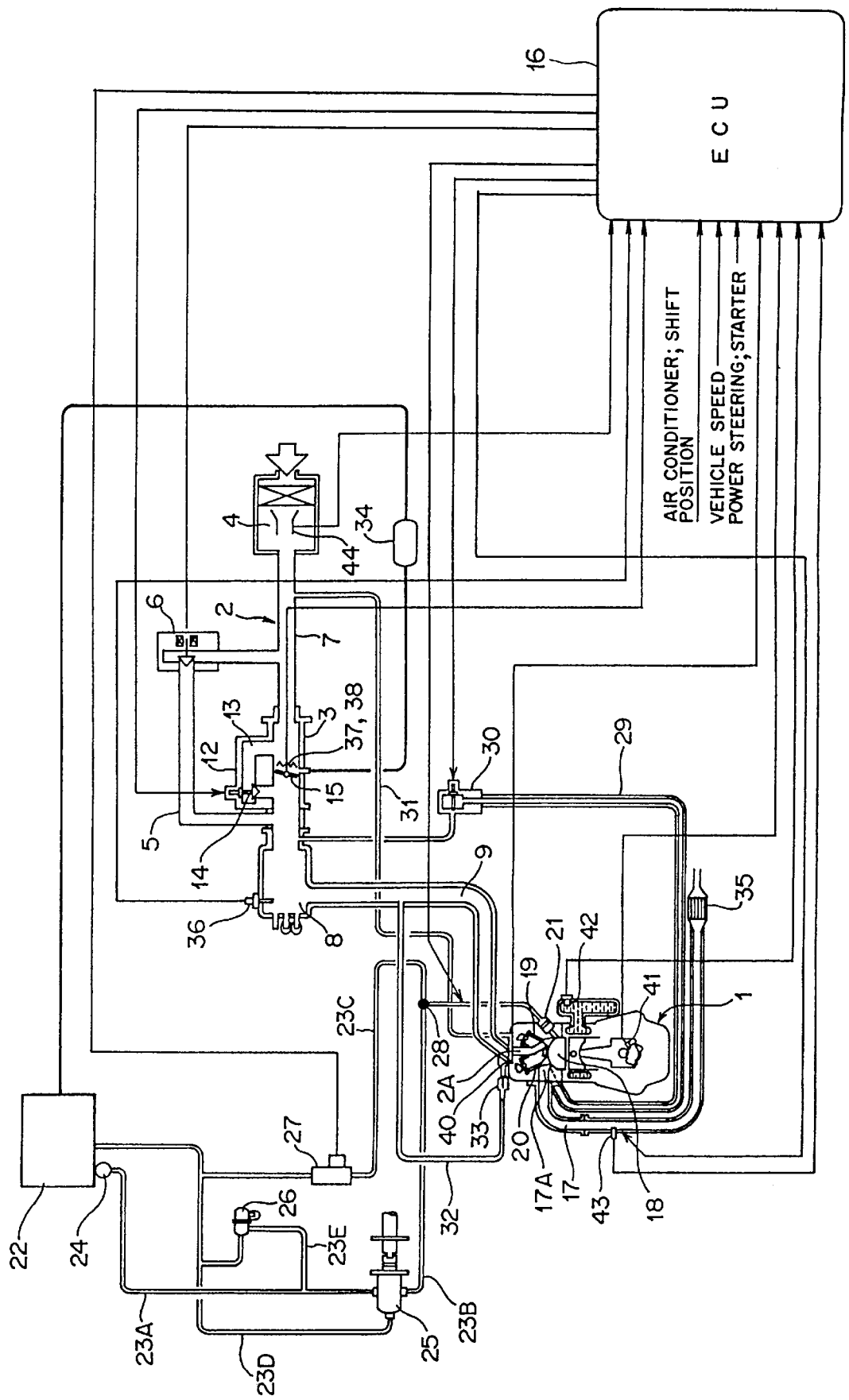
FIG. 4 is a view showing a configuration of a main part of an in-cylinder injection internal combustion engine in accordance with an embodiment of the present invention.

Depicted in FIG. 4 are an engine main body 1, an intake passage 2, a throttle-valve-installed section 3, an air cleaner 4, a bypass passage (second bypass passage) 5, and a second air bypass valve (#2ABV) 6 which can adjust the air amount flowing through the bypass passage 5 and function as intake amount correcting means. The intake passage 2 comprises, successively connected from the upstream side, an intake pipe 7, a surge tank 8, and an intake manifold 9. The bypass passage 5 is disposed upstream the surge tank 8. While the bypass valve 6 is driven by a stepping motor so as to attain a predetermined opening degree, its opening degree may be adjusted by a duty control of a solenoid valve.

Further, means 12 is equipped with an idle speed control function and comprises a bypass passage (first bypass passage) 13 and a first air bypass valve (#1ABV) 14 as a bypass valve. The #1ABV 14 is driven by a non-depicted stepping motor and functions as intake amount correcting means.

Also provided is a throttle valve (intake throttle valve) 15. Though the one mechanically interlocked with an accelerator pedal (not depicted) is used here, an electric-motor-driven valve known as drive-by-wire (DBW) may also be used as the throttle valve 15. In this case, the bypass valve may be omitted, so that the driving of the electric motor is corrected by an extent corresponding to the correction air amount obtained by this bypass valve.

Here, the first bypass passage 13 and the second bypass passage 5 are connected to the intake passage 2 respectively by their upstream and downstream ends, while bypassing the portion of the intake passage 2 to which the throttle valve 15 is attached.

Opening/closing control of each of the second air bypass valve 6 and the first air bypass valve 14 is performed via an electronic control unit (ECU) 16.

Also provided are an exhaust passage 17 and a combustion chamber 18. Opening portions of the intake passage 2 and the exhaust passage 17 with respect to the combustion chamber 18, i.e., an intake port 2A and an exhaust port 17A, are respectively equipped with an intake valve 19 and an exhaust valve 20.

Numeral 21 refers to a fuel injection valve (injector), which is disposed in this engine so as to directly inject fuel into the combustion chamber 18.

Further provided are a fuel tank 22, fuel supply paths 23A to 23E, a low-pressure fuel pump 24, a high-pressure fuel pump 25, a low-pressure regulator 26, a high-pressure regulator 27, and a delivery pipe 28; whereby fuel within the fuel tank 22 is driven by the low-pressure fuel pump 24 and is further pressurized by the high-pressure fuel pump 25 so as to be supplied, in a predetermined high-pressure state, to the injector 21 through the fuel supply paths 23A and 23B and the delivery pipe 28. Here, the fuel pressure emitted from the low-pressure fuel pump 24 is adjusted by the low-pressure regulator 26, whereas the fuel pressure pressurized by the high-pressure fuel pump 25 so as to be guided to the delivery pipe 28 is adjusted by the high-pressure regulator 27.

Also provided are an exhaust gas recirculation passage (EGR passage) 29 for recirculating the exhaust gas within the exhaust passage 17 of the engine 1 into the intake passage 2, a stepping motor type valve (EGR valve) 30 as exhaust gas amount adjusting means for adjusting the amount of recirculation of exhaust gas flowing into the intake passage 2 through the EGR passage 29, a flow path 31 for returning blow-by gas, a passage 32 for positive crankcase ventilation, a valve 33 for positive crankcase ventilation, a canister 34, and an exhaust gas purifying catalyst 35 (catalytic converter rhodium here).

As shown in FIG. 4, the ECU 16 controls not only the air bypass valves 6 and 14 but also the injector 21, an ignition coil for a non-depicted spark plug, and the EGR valve, and performs fuel pressure control by means of the high-pressure regulator 27. Accordingly, connected to the ECU 16 are an airflow sensor 44, an intake temperature sensor 36, a throttle position sensor (TPS) 37 for detecting the throttle opening degree, an idle switch 38, an air conditioner switch (not depicted), a gear position sensor (not depicted), a vehicle speed sensor (not depicted), a power steering switch (not depicted) for detecting an operation state of a power steering, a starter switch (not depicted), a first cylinder sensor 40, a crank angle sensor 41, a water temperature sensor 42 for detecting the temperature of cooling water for the engine, an $O_2$ sensor 43 for detecting the oxygen concentration in exhaust gas, and the like.

Here, the engine rotational speed can be computed according to the crank angle sensor 41. For example, such an engine rotational speed computing function is implemented within the ECU 16. While the crank angle sensor 41 and this engine rotational speed computing function constitute an engine rotational speed sensor, the crank angle sensor 41 is also referred to as engine rotational speed sensor here for convenience.

In the following, contents of control concerning the engine through the ECU 16 will be explained with reference to the control block diagram of FIG. 5.

This engine switches, according to its operation state, between pre-mixture burn operation which can be established by uniformly injecting fuel into the fuel combustion chamber 18 and a stratified burn operation which can be established by concentrating the injected fuel around the non-depicted spark plug facing into the combustion chamber 18.

This engine is provided, as engine operation modes, with four fuel injection modes comprising a later lean stratified burn operation mode (later lean mode) in which fuel is injected at a compression stroke so as to perform stratified lean burn, an earlier lean burn operation mode (earlier lean mode) in which fuel is injected at an intake stroke so as to perform pre-mixture burn, a stoichiometric feedback burn operation mode (stoichiometric mode), and an open-loop burn operation mode (stoichiometric mode or enriched mode), as well as a fuel cut mode for stopping (cutting) fuel injection.

By the control unit for this in-cylinder injection internal combustion engine, one of these modes is selected according to an engine operation state, a vehicle driving state, or the like, thus controlling the fuel supply. Here, in each fuel injection mode, cases where the EGR is actuated and not actuated are set.

Here, further explanation will be made about the fuel injection modes. Namely, in general, the enriched operation mode, stoichiometric operation mode, earlier lean mode, and later lean mode are set with respect to engine rotational speed Ne and engine load Pe so as to attain a tendency in terms of region such as that shown in FIG. 6.

Among the above-mentioned fuel injection modes, the later lean mode can realize the leanest burn (where the air/fuel ratio is on the order of 30 to 40). In this mode, fuel injection is performed at a stage very close to an ignition timing such as the later stage of a compression stroke, and the fuel is concentrated in the vicinity of the spark plug so as to be partially enriched, while attaining a lean state as a whole. Consequently, economical operation can be performed while ignitability and combustion stability are secured.

While the earlier lean mode can realize lean burn (where the air/fuel ratio is on the order of 20 to 24) as well, fuel is injected in this mode at the intake stroke earlier than that performed in the later lean mode, so that fuel is diffused within the combustion chamber, thus making the overall air/fuel ratio lean. Consequently, a certain degree of output is maintained while ignitability and combustion stability are secured, whereby economical operation can be performed.

In the stoichiometric operation mode, a sufficient engine output can efficiently be obtained while the air/fuel ratio is kept at the stoichiometric state or in the vicinity thereof according to the output of the $O_2$ sensor.

In the open-loop burn operation mode, burning is effected at the stoichiometric air/fuel ratio or an (enriched) air/fuel ratio richer than that, by open-loop control in order to obtain sufficient output upon acceleration, starting, or the like.

Figure 1:
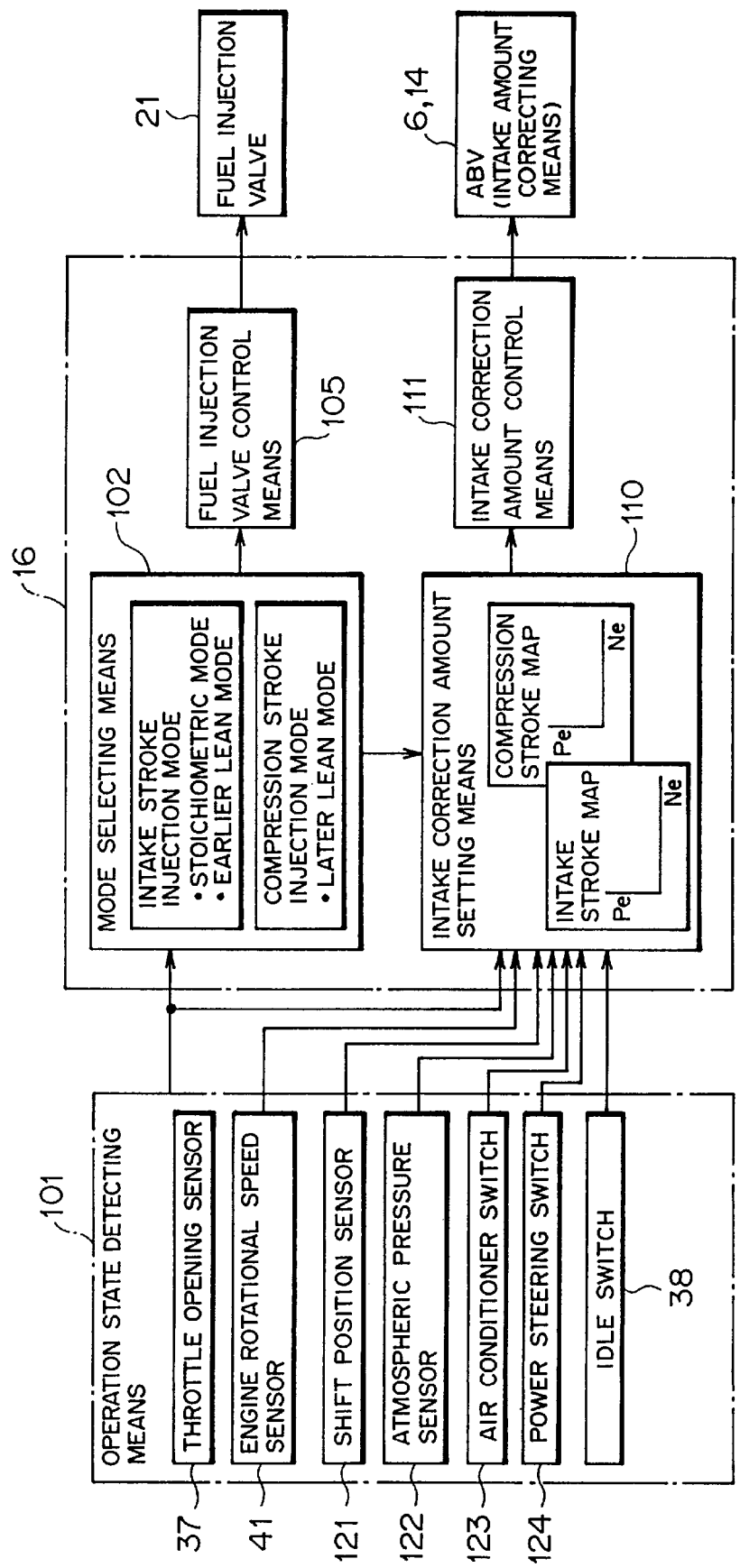
FIG. 1 is a block diagram showing a configuration of a main part of a control unit for in-cylinder injection internal combustion engine as an embodiment of the present invention.
Figure 6:
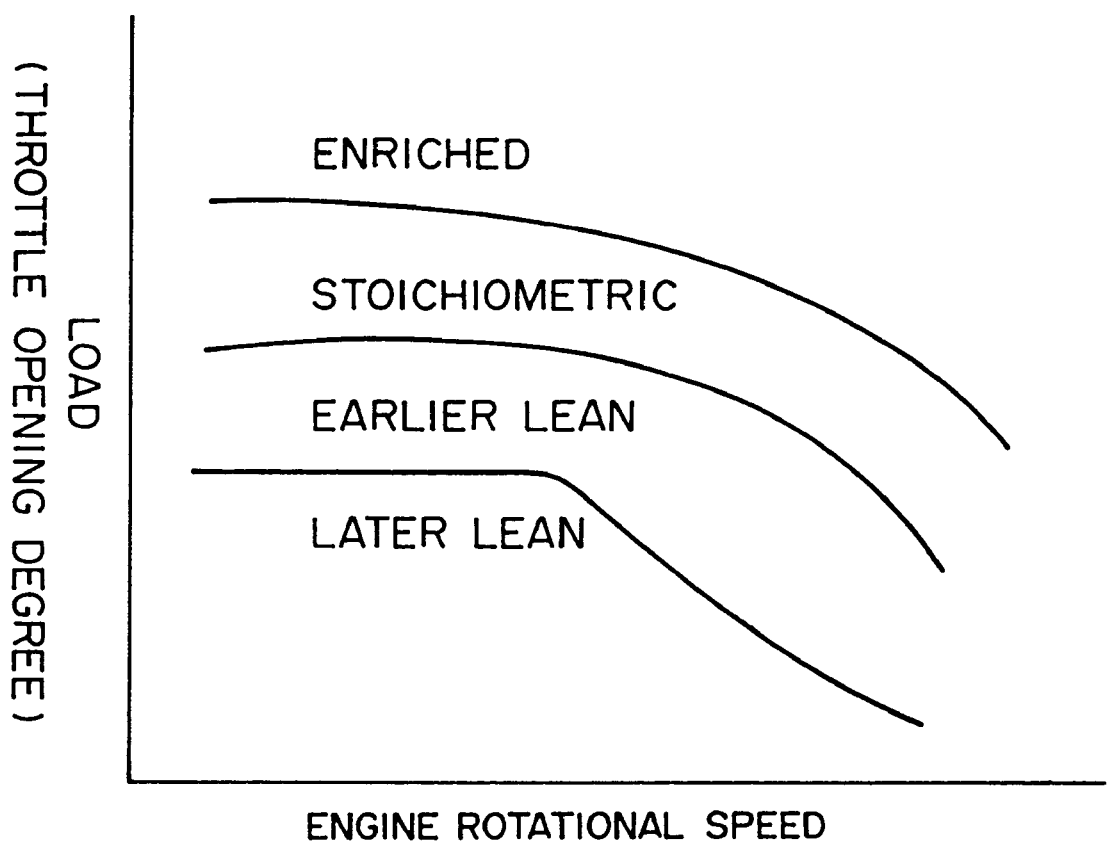
FIG. 6 is a view for explaining operation modes of the in-cylinder injection internal combustion engine in accordance with an embodiment of the present invention.

Such operation modes are selected by a functional section (mode selecting section) 102 disposed within the ECU 16 as shown in FIG. 1 with a regional tendency such as that shown in FIG. 6 according to information (engine rotational speed Ne and engine load Pe) from an operation state detecting means 101. Then, according to each mode, an air/fuel ratio is set according to the engine operation state, and a fuel injection valve control amount such as fuel injection amount or fuel injection timing is set by a fuel injection valve control means 105 so as to control the fuel injection valve 21, while an intake amount (intake correction amount) is controlled through the ABV valves 6 and 14 according to thus set air/fuel ratio.

Here, an explanation will be made about the opening degree control of each of the valves 6 and 14 (i.e., intake amount correcting means), which is a characteristic feature of the present invention. Namely, as shown in FIG. 1, in the ECU 16, a function (intake correction amount setting means) 110 for setting a required air amount (referred to as intake correction amount since it corrects the intake effected by the throttle valve) according to the information (engine operation state) from the operation state detecting means 101, and a function (intake correction amount control means) 111 for outputting an instruction signal to each of the valves 6 and 14 in response to the required air amount set by the intake correction amount setting means 110 control the opening degree of each of the valves (intake amount correcting means) 6 and 14.

The intake correction amount setting means 110 sets the intake correction amount according to the information from the operation state detecting means 101. Specifically, as shown in FIG. 1, it takes in not only the engine rotational speed Ne and the engine load Pe determined according to the data detected by the throttle position sensor 37 or a non-depicted accelerator position sensor or the like, but also states of engine operation environments, i.e., data from a shift position sensor 121 for detecting a shift state of the transmission, an atmospheric pressure sensor 122, an air conditioner switch 123 for detecting an actuation state of the air conditioner as an accessory, a power steering switch 124 for detecting an actuation state of the power steering as an accessory, an idle switch 38, and the like; and sets the intake correction amount from a map [predetermined relationship (between operation state and intake correction amount)] according to these data.

Figure 5:
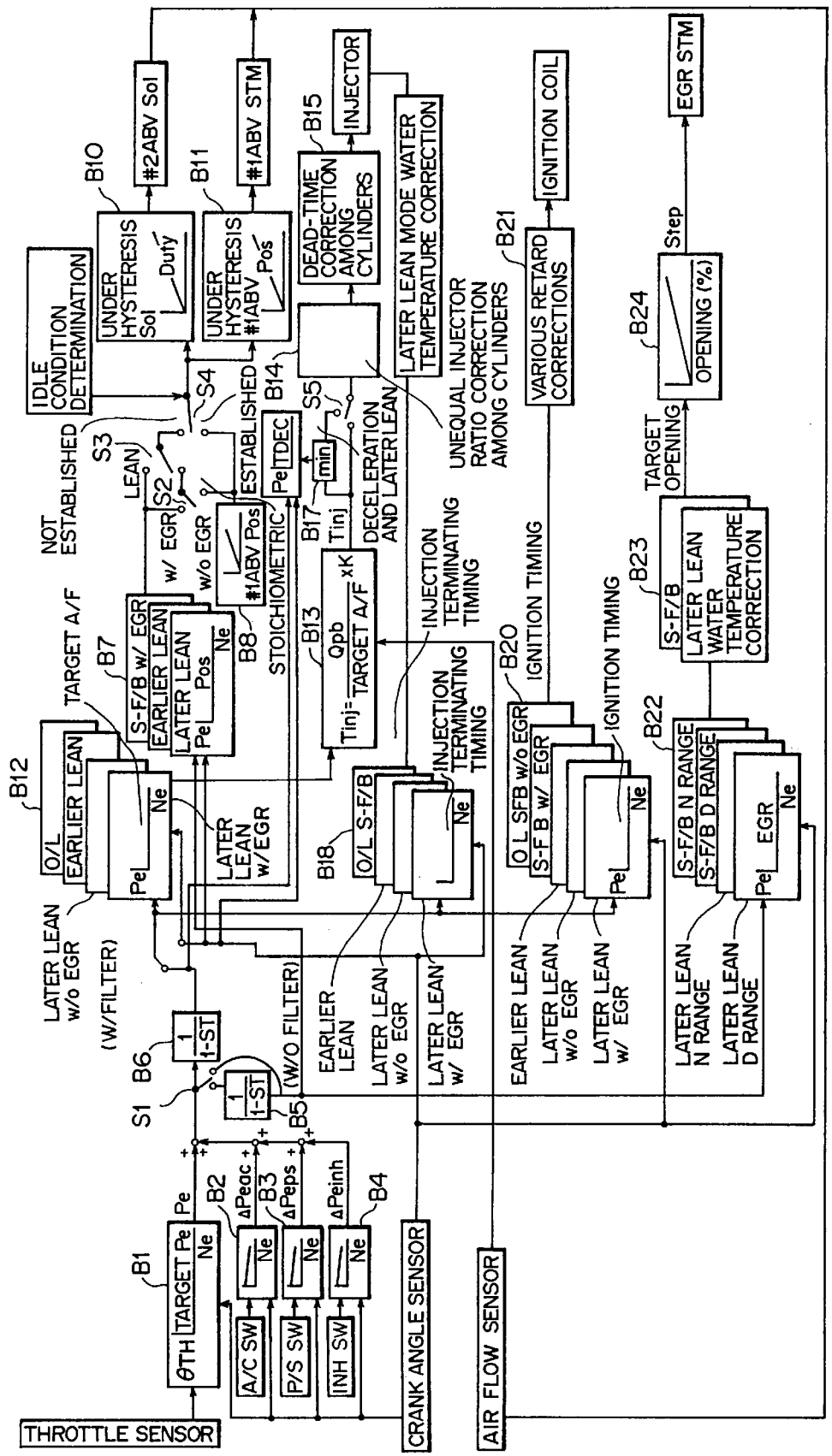
FIG. 5 is a control block diagram showing the in-cylinder injection internal combustion engine in accordance with an embodiment of the present invention.

Namely, as shown in FIG. 5, a target engine load Pe (target Pe) is initially set, according to a map, from a throttle opening degree θth detected by the throttle sensor or the engine rotational speed Ne based on the output of the non-depicted accelerator opening sensor and the information detected by the crank angle sensor (block B1) On the other hand, based on the information from the air conditioner switch, when the air conditioner is on, an air-conditioner-related correction amount ΔPeac is set from the engine rotational speed Ne according to a map (block B2). Based on the information from the power steering switch, when the power steering is on, a power-steering-related correction amount ΔPeps is set from the engine rotational speed Ne according to a map (block B3). Based on the information from the inhibitor switch, upon starting, an inhibitor-related correction amount ΔPeinh is set from the engine rotational speed Ne according to a map (block B4).

Also, though not depicted, for the shift position sensor 121 and the atmospheric pressure sensor 122, correction amounts corresponding to their respective parameters are set.

Then, according to these specific correction amounts ΔPeac, ΔPeps, ΔPeinh, and the like, the target Pe is appropriately corrected. Thus corrected target Pe is appropriately filtered through a switch S1 (block B5), and a control amount Pos concerning a valve opening degree corresponding to a required air amount (or target intake air amount) Q is set, according to a map, from thus obtained target Pe and the engine rotational speed Ne.

As shown in block B7, in order to set the control amount Pos, from a plurality of maps, the one corresponding to the engine operation state is selectively used, and a signal is outputted through switches S2 and S3 in response to the engine operation state. Here, maps are provided for three modes, as the engine operation states, comprising the later lean mode that yields the leanest burn, the earlier lean mode that yields the next leanest burn thereto, and an EGR-actuated state in the stoichiometric operation mode; and the required air amount is set only in these modes.

In the case where the idle operation state is established, by a switch S4, a control amount #1ABVPos (which becomes a target opening degree based on the #1ABV valve in this case) for a required air amount (or target intake air amount) #1ABVQ based on feedback of the engine rotational speed is set as shown in block B8.

The functional section for setting the amount corresponding to the required air amount Q, #1ABVQ, through the above-mentioned blocks B7 and B8 is equivalent to the required air amount setting means (intake correction amount setting means) 110.

In response to thus obtained control amount Pos or #1ABVPos, setting of the opening position of the air bypass valve 6 or duty cycle (block B10) and setting of the air bypass valve 14 (block B11) are effected, whereby the air bypass valves 6 and 14 are controlled so as to attain predetermined states.

Meanwhile, in the compression stroke injection mode (later lean) in the in-cylinder injection engine, since ultra-lean burning is effected, the air/fuel ratio is set very high, whereby the intake air amount is quite large in relation to the engine-generated torque. Consequently, the intake amount is corrected in a region where the magnitude of intake vacuum is relatively low. In the intake stroke injection mode, by contrast, since operation is performed under the earlier lean mode or stoichiometric mode with a relatively high air/fuel ratio, the intake air amount is not relatively large in relation to the engine-generated torque, whereby the intake amount is corrected in a region where the magnitude of intake vacuum is relatively large.

Figure 2:
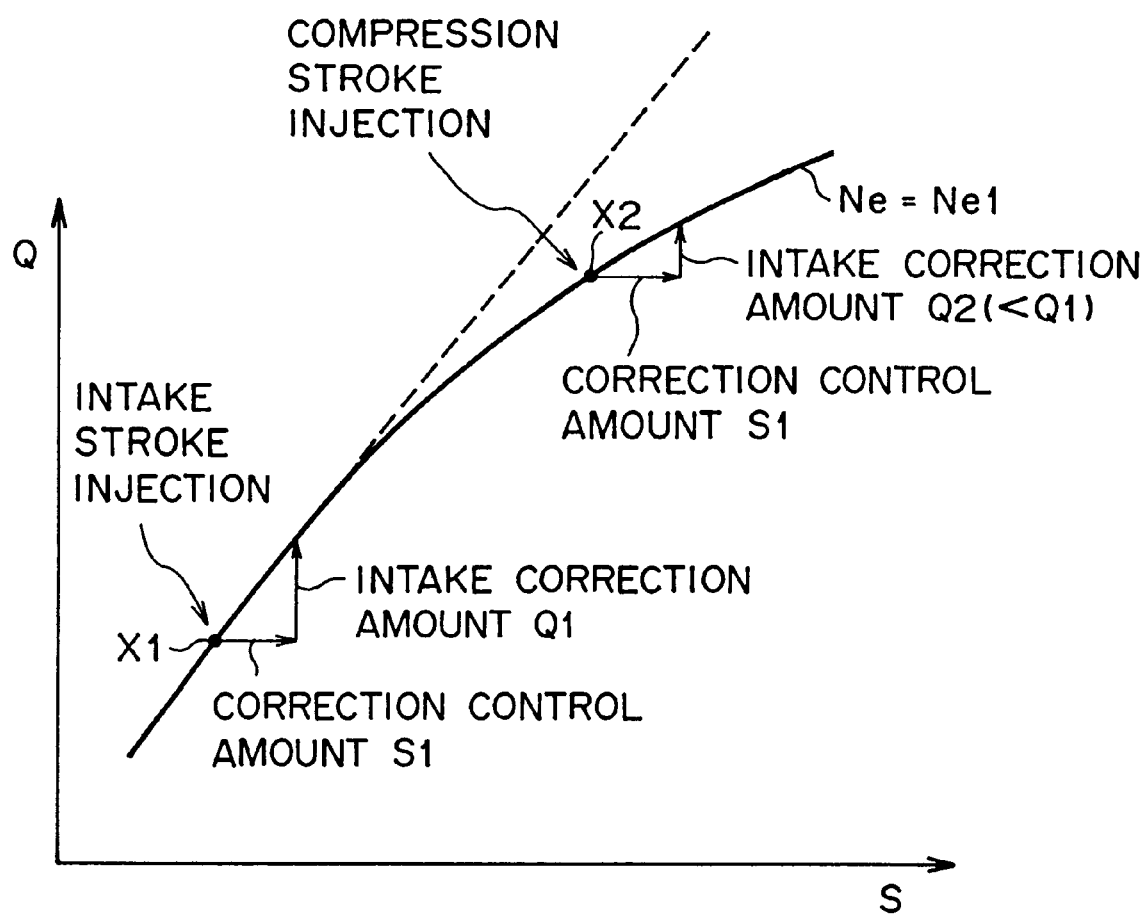
FIG. 2 is a view for explaining an intake correction amount setting characteristic in the control unit for in-cylinder injection internal combustion engine as an embodiment of the present invention.

For example, the solid line shown in FIG. 2 indicates intake air amount Q in relation to intake opening area S. As depicted, the intake air amount control (intake correction amount control) in the compression stroke injection mode (later lean) is performed in a region where the intake opening area S is relatively large, whereas the intake air amount control (intake correction amount control) in the intake stroke injection mode is performed in a region where the intake opening area S is relatively small. Here, the intake opening area S corresponds to the engine load state and is determined according to the opening degrees of the throttle valve (intake throttle valve) 15 and the ABVs (intake amount correcting means) 6 and 14.

In FIG. 2, point X1 indicates a point where the intake opening area S and the intake air amount Q correspond to each other when engine torque TA is generated in the intake stroke injection mode, whereas point X2 indicates a point where the intake opening area S and the intake air amount Q correspond to each other when engine torque TA substantially the same as that at point X1 is generated in the compression stroke injection mode.

As depicted, when the intake opening area S is increased by a predetermined amount S1 at the point X1 in the intake stroke injection mode, the intake correction amount increases by Q1. By contrast, when the intake opening area S is increased by the predetermined amount S1 at the point X2 in the compression stroke injection mode as in the case of the point X1, the intake correction amount increases by Q2. This intake correction amount Q2 is smaller than the intake correction amount Q1 in the case of the point X1.

The intake amount control in the intake stroke injection mode is effected in a region where the intake opening area S is relatively small. Since this region is an area where the magnitude of intake vacuum downstream the throttle valve 15 is relatively large, the intake opening area S and the intake air amount Q increase substantially linearly. By contrast, the intake amount control in the compression stroke injection mode is effected in a region where the intake opening area S is relatively large. Since this region is an area where the magnitude of intake vacuum downstream the throttle valve 15 is relatively small, the intake opening area S and the intake air amount Q deviate from their linear relationship of increase, whereby the intake air amount Q does not increase so much as the intake opening area S increases. Here, the dotted line in FIG. 2 indicates a case where the intake opening area S and the intake air amount Q maintain a linear relationship therebetween.

Here, in the case where the intake opening area S and the control amount Pos concerning the valve opening degree are substantially in proportion to each other, in order to increase the intake opening area S by a predetermined amount S1, it is sufficient for the control amount Pos to be increased by a correction control amount P1. In the case where the intake opening area S and the control amount Pos concerning the valve opening degree are not in proportion to each other, an approximate expression of their relationship or the like may be used to compute a correction control amount P2 from the intake opening area S, and the control amount Pos may be increased by thus computed correction control amount P2.

Thus, since the intake air amount changing in relation to the intake opening area varies; when the same map (relationship between the engine operation state and the control amount Pos) is used for the control amount concerning the valve opening degree for adjusting the intake opening area in both intake stroke injection mode and compression stroke injection mode, an optimal intake correction amount may not be set for each operation mode, thus deteriorating drivability.

Therefore, in this apparatus, different maps (relationships between the engine operation state and control amount Pos) are respectively set for the intake stroke injection mode and the compression stroke injection mode, so that the intake correction control is performed according to the map for each mode.

Here, different maps (relationships) may be set respectively for the intake stroke injection mode and the compression stroke injection mode concerning not only the relationship between the engine operation state (engine rotational speed Ne and engine load information Pe in particular) and the control amount Pos, but also correction amounts based on other data, i.e., those from the shift position sensor 121, atmospheric pressure sensor 122, air conditioner switch 123, power steering switch 124, idle switch 38, and the like, so as to perform the intake correction control.

For example, FIG. 3 shows a state of control for the idle speed Ne effected when the air conditioner switch 123 is turned on from its off state. Here, the corresponding intake amount is adjusted from Q1 to Q3 in the case of the earlier lean (intake stroke injection), whereby the idle speed Ne is controlled so as to increase from Ni1 to Ni2. In the later lean (compression stroke injection), on the other hand, the intake amount is adjusted from Q2 to Q4, whereby the idle speed Ne is controlled so as to increase from Nil to Ni2.

As depicted, between the intake stroke injection mode and the compression stroke injection mode, not only the basic intake amount varies but also the intake correction amount differs, i.e., becomes α and β respectively in the intake stroke injection mode and the compression stroke injection mode. Accordingly, for the intake correction amount control based on the air conditioner switch information, it is preferred that different maps (relationships) be set respectively for the intake stroke injection mode and the compression stroke injection mode.

As a method other than that mentioned above, a common intake correction amount may be set among the individual operation modes, and a mode-related coefficient (gain) may be set for each mode, so that thus set intake correction amount is adjusted in terms of gain by its mode-related coefficient, thus setting a final intake correction amount (used for control).

In the following, with reference to FIG. 5, respective controls for the injector, ignition coil, and EGR will be explained.

In order to drive the injector, it is necessary to set the injection starting timing and injection terminating timing of the injector. Here, an injector driving time Tinj and the injection terminating timing of the injector are set, and based thereon, as the injection starting timing of the injector is counted backward, the injector driving timing is determined. These settings are effected by the ECU 16 according to the engine operation state.

In order to set the injector driving time Tinj, an air/fuel ratio is initially set (block B12), according to a map, from the corrected target Pe after filtering (block B6) and the engine rotational speed Ne. Also, in this case, different setting maps are provided for four modes comprising the EGR-actuated state in the later lean mode, EGR-stopped state in the later lean mode, earlier lean mode, and open-loop mode; and the one corresponding to the engine operation mode is selectively used.

From thus obtained air/fuel ratio A/F and an intake amount Qpb detected by the air flow sensor, the injector driving time Tinj is computed (block B13).

This injector driving time Tinj is corrected in terms of unequal injector ratios among cylinders (block B14) and dead times among cylinders (block B15). On the other hand, a deceleration injection time TDEC is computed from the target Pe and the engine rotational speed Ne (block B16). When the operation is in both decelerated state and later lean, of the injector driving time Tinj obtained at the block B13 and the deceleration injection time TDEC, the smaller value is selected through a switch S5 (block B17) and is determined as the injector driving time.

Also, since the air/fuel ratio A/F changes as the above-mentioned intake air amount is corrected, the injector driving time is corrected as the intake air amount is corrected, so as to attain a constant air/fuel ratio A/F, thereby preventing exhaust gas performances from deteriorating.

Also, the injection terminating timing of the injector is set (block B18), according to a map, from the corrected target Pe after filtering (block B6) and the engine rotational speed Ne. In this case, different setting maps are provided for four modes comprising the EGR-actuated state in the later lean mode, EGR-stopped state in the later lean mode, earlier lean mode, and open-loop or stoichiometric feedback operation mode; and the one corresponding to the engine operation mode is selectively used.

In the case of later lean mode, thus obtained injection terminating timing is corrected in terms of water temperature so as to yield an injection terminating timing.

Based on thus obtained injector driving time Tinj and injection terminating timing, the injector is driven.

Also, the ignition timing of the spark plug effected by the ignition coil is set (block B20), according to a map, from the corrected target Pe after filtering (block B6) and the engine rotational speed Ne. In this case, different setting maps are provided for five modes comprising the EGR-actuated state in the later lean mode, EGR-stopped state in the later lean mode, earlier lean mode, EGR-actuated state in stoichiometric feedback operation, and EGR-stopped state in open-loop or stoichiometric feedback operation. Thus obtained ignition timing is subjected to various kinds of retard corrections (block B 21), and the ignition coil is controlled on the basis thereof.

Also, the flow rate of the EGR is set (block B22), according to a map, from the corrected target Pe after filtering (block B6) and the engine rotational speed Ne. In this case, the setting maps are provided for four modes comprising the later lean mode in the D range, later lean mode in the N range, stoichiometric feedback operation mode in the D range, and stoichiometric feedback operation mode in the N range.

Thus obtained flow rate of the EGR is corrected in terms of water temperature (block B23), and a control amount (duty cycle) corresponding to the opening degree is set (block B24), so as to control the flow rate of the EGR. Here, for the water temperature correction (block B23), maps corresponding to engine operation states (two modes comprising the later lean mode and stoichiometric feedback operation mode here) are used.

The control unit for in-cylinder injection internal combustion engine as an embodiment of the present invention sets different maps (relationships between engine operation state and control amount Pos) respectively for the intake stroke injection mode and compression stroke injection mode, and the intake correction amount is controlled on the basis thereof, whereby the intake correction amount can be optimally corrected in each operation mode, thus improving drivability in each operation mode.

Also, as different maps (relationships) are set respectively for the intake stroke injection mode and the compression stroke injection mode concerning not only the relationship between the engine operation state (engine rotational speed Ne and engine load information Pe in particular) and the control amount Pos, but also correction amounts based on other data, i.e., those from the shift position sensor 121, atmospheric pressure sensor 122, air conditioner switch 123, power steering switch 124, idle switch 38, and the like, so as to perform the intake correction control; the intake correction amount can be optimally corrected in each operation mode, thus improving drivability in each operation mode as well.

Such a technique for setting different maps (relationships) respectively for the intake stroke injection mode and compression stroke injection mode is quite effectively employed upon idling operation of an engine having a high intake-controlling effect in particular.

Though the above-mentioned embodiment explains a case where the intake air amount is corrected by use of bypass valves, similar effects can also be obtained when such a technique is applied to an electric-motor-driven throttle valve which is driven by an electric motor such as that mentioned above.

Capability of Exploitation in Industry

An appropriate intake amount correction can be effected for each operation mode such as compression stroke injection mode and intake stroke injection mode in an in-cylinder injection internal combustion engine, thus allowing drivability to improve in the in-cylinder injection internal combustion engine. Consequently, the present invention is suitable for an engine for a vehicle such as automobile. It can simultaneously satisfy various requirements for a vehicle engine such as improvement in drivability due to stable burning, reduction of operation cost due to lower fuel consumption, environmental protection due to acceleration of exhaust gas purification, and the like, thus being quite useful.

I claim:

1. A control unit for an in-cylinder injection internal combustion engine in which fuel is directly injected into a combustion chamber and is adapted to select, according to an operation state of said internal combustion engine, a compression stroke injection mode for mainly injecting fuel at a compression stroke and an intake stroke injection mode for mainly injecting fuel at an intake stroke;

said control unit comprising:

load correlation value detecting means (37) for detecting a load correlation value of said internal combustion engine, rotational speed detecting means (41) for detecting an engine rotational speed of said internal combustion engine, target load level setting means (B1) for setting a target load level according to the load correlation value detected by said load correlation value detecting means (37) and the engine rotational speed detected by said rotational speed detecting means (41), target air/fuel ratio setting means (B12) for setting a target air/fuel ratio at a first air/fuel ratio which is on a fuel-leaner side of a stoichiometric air/fuel ratio when said compression stroke injection mode is selected, and at a second air/fuel ratio which is on a fuel-richer side of said first air/fuel ratio when said intake stroke injection mode is selected, intake amount correcting means (6) for changing an amount of intake supplied to said internal combustion engine, intake correction amount setting means (110) for setting, according to the target load level set by said target load level setting means (B1), a first intake correction amount required in said compression stroke injection mode or a second intake correction amount required in said intake stroke injection mode, and intake amount correction control means (111) for controlling operation of said intake amount correcting means (6) according to said first or second intake correction amount set by said intake correction amount setting means (110).

2. The control unit for an in-cylinder injection internal combustion engine of claim 1, wherein said intake amount correction control means (110) sets said first intake correction amount required for said first air/fuel ratio in said compression stroke injection mode greater than said second intake correction amount required for said second air/fuel ratio in said intake stroke injection mode.

3. The control unit for an in-cylinder injection internal combustion engine of claim 1, wherein said intake amount correction control means (111) sets a control amount of said intake amount correcting means (6) required in each of said injection modes according to a parameter which is in correlation with an intake opening area adjusted in accordance with a state of load of said internal combustion engine.

4. The control unit for an in-cylinder injection internal combustion engine of claim 3, wherein said intake amount correction control means (111) sets a first control amount of said intake amount correcting means (6) for obtaining a predetermined air amount required in said compression stroke injection mode greater than a second control amount of said intake amount correcting means (6) for obtaining said predetermined air amount required in said intake stroke injection mode.

5. The control unit for an in-cylinder injection internal combustion engine of claim 1, comprising operation environmental state detecting means (122, 123, 124) for detecting at least one of a shift state of a transmission coupled to said internal combustion engine, operation state of an accessory directly or indirectly driven by said internal combustion engine, and an atmospheric pressure.

6. The control unit for an in-cylinder injection internal combustion engine of claim 5, comprising target load level correcting means which determines a target environmental load level according to an operation environmental state detected by said operation environmental state detecting means (122, 123, 124), and determines a corrected target load level from said target environmental load level and the target load level set by said target load level setting means;

wherein said intake correction amount setting means (110) sets, according to the corrected target load level determined by said target load level correcting means, said first or second intake correction amount required in said compression stroke injection mode or intake stroke injection mode.

7. The control unit for an in-cylinder injection internal combustion engine of claim 6, wherein said target load level correcting means computes an environmental load correction amount corresponding to each operation environmental state detected by said operation environmental state detecting means (122, 123, 124) and the engine rotational speed detected by said rotational speed detecting means (41).

8. The control unit for an in-cylinder injection internal combustion engine of claim 5, wherein said load correlation value detecting means is constituted by throttle valve opening detecting means (37) for detecting an opening degree of a first throttle valve disposed in an intake passage of said internal combustion engine.

9. The control unit for an in-cylinder injection internal combustion engine of claim 8, wherein said intake correction amount setting means (110) sets, when said throttle valve opening detecting means (37) detects a full open state of said throttle valve, a first intake correction amount corresponding to a predetermined change in an operation environmental state detected by said operation environmental state detecting means (122, 123, 124) in said compression stroke injection mode greater than a second intake correction amount corresponding to said predetermined change in the operation environmental state in said intake stroke injection mode.

10. The control unit for an in-cylinder injection internal combustion engine of claim 5, comprising environmental intake amount correcting means which determines an environmental correction intake amount according to an operation environmental state detected by said operation environmental state detecting means (122, 123, 124), determines a third intake correction amount from said environmental correction intake amount and said first intake correction amount required in said compression stroke injection mode and set by said intake correction amount setting means (110), and determines a fourth intake correction amount from said environmental correction intake amount and said second intake correction amount required in said intake stroke injection mode and set by said intake correction amount setting means (110).

11. The control unit for an in-cylinder injection internal combustion engine of claim 10, wherein said environmental intake amount correcting means computes an environmental correction intake amount corresponding to each operation environmental state detected by said operation environmental state detecting means (122, 123, 124) and the engine rotational speed detected by said rotational speed detecting means (41).

12. The control unit for an in-cylinder injection internal combustion engine of claim 10, wherein said intake correction amount setting means (110) sets said first intake correction amount required for said first air/fuel ratio in said compression stroke injection mode greater than the second intake correction amount required for said second air/fuel ratio in said intake stroke injection mode.

13. The control unit for an in-cylinder injection internal combustion engine of claim 10, wherein said intake amount correction control means (111) sets a first control amount of said intake amount correcting means (6) for obtaining a predetermined air amount required in said compression stroke injection mode greater than a second control amount of said intake amount correcting means (6) for obtaining said predetermined air amount required in said intake stroke injection mode.

14. The control unit for an in-cylinder injection internal combustion engine of claim 1, including an air bypass passage (5) which bypasses a first throttle valve (15) disposed in an intake passage of said internal combustion engine and communicates with said intake passage upstream and downstream said first throttle valve (15), and an electric air bypass valve (6) for opening and closing the air bypass passage (5);

wherein said intake amount correction control means (111) controls said air bypass valve (6) such that an intake amount supplied through said air bypass passage (5) becomes said first or second intake correction amount.

15. The control unit for an in-cylinder injection internal combustion engine of claim 14, wherein said intake amount correction control means (111) sets a first opening control amount of said air bypass valve (6) for obtaining a predetermined air amount required in said compression stroke injection mode greater than a second operation opening control amount of said air bypass valve (6) for obtaining said predetermined air amount required in said intake stroke injection mode.

16. The control unit for an in-cylinder injection internal combustion engine of claim 1, wherein said load correlation value detecting means is constituted by accelerator opening detecting means (37) for detecting an opening degree of an accelerator pedal which is attached to a vehicle installing said internal combustion engine therein and is operated by a driver;

wherein said internal combustion engine comprises:
a second throttle valve (6) for electrically opening and closing an intake passage of said internal combustion engine, target opening degree setting means for setting a target opening degree of said second throttle valve (6) according to an opening degree of the accelerator pedal detected by said accelerator opening detecting means (37), and throttle opening control means for controlling said second throttle valve (6) so as to attain the target opening degree set by said target opening degree setting means;

wherein said intake amount correcting means is constituted by said second throttle valve (6) and throttle opening control means.

17. The control unit for an in-cylinder injection internal combustion engine of claim 16, wherein said intake amount correction control means (111) sets a first opening degree correction amount of said second throttle valve with respect to said target opening degree for obtaining a predetermined air amount required in said compression stroke injection mode greater than a second opening degree correction amount of said second throttle valve with respect to said target opening degree for obtaining said predetermined air amount required in said intake stroke injection mode.

18. The control unit for an in-cylinder injection internal combustion engine of claim 1, comprising intake amount detecting means (44) for detecting an amount of intake supplied to said internal combustion engine, wherein said target air/fuel ratio setting means (B12) determines the target air/fuel ratio according to the intake amount detected by said intake amount detecting means (44) when said intake stroke injection mode is selected, and according to the load correlation value detected by said load correlation value detecting means (37) when said compression stroke injection mode is selected.

19. A control unit for an in-cylinder injection internal combustion engine in which fuel is directly injected into a combustion chamber and is adapted to select, according to an operation state of said internal combustion engine, a compression stroke injection mode for mainly injecting fuel at a compression stroke and an intake stroke injection mode for mainly injecting fuel at an intake stroke;

said control unit comprising:
load correlation value detecting means (37) for detecting a load correlation value of said internal combustion engine, rotational speed detecting means (41) for detecting an engine rotational speed of said internal combustion engine, target load level setting means (B1) for setting a target load level according to the load correlation value detected by said load correlation value detecting means (37) and the engine rotational speed detected by said rotational speed detecting means (41), target air/fuel ratio setting means (B12) for setting a target air/fuel ratio at a first air/fuel ratio which is on a fuel-leaner side of a stoichiometric air/fuel ratio when said compression stroke injection mode is selected, and at a second air/fuel ratio which is on a fuel-richer side of said first air/fuel ratio when said intake stroke injection mode is selected, intake amount correcting means (6) for changing an amount of intake supplied to said internal combustion engine, intake correction amount setting means (110) for setting, according to the target load level set by said target load level setting means (B1), an intake correction amount, intake correction amount adjusting means (110) for adjusting said intake correction amount according to a correction coefficient corresponding to a selected injection mode, and intake amount correction control means (111) for controlling operation of said intake amount correcting means (6) according to the intake correction amount adjusted by said intake correction amount adjusting means (110) corresponding to each injection mode.

* * * * *

UNITED STATES PATENT AND TRADEMARK OFFICE
CERTIFICATE OF CORRECTION

PATENT NO. : 5,975,044

DATED : November 2, 1999

INVENTOR(S): KAMURA et al.

It is certified that error appears in the above-identified patent and that said Letters Patent are hereby corrected as shown below:

Column 13

Line 26, change "stroke;" to --stroke,--;

Line 28, delete "(37)";

Line 30, change "engine," to --engine;--

Line 31, delete "(41);

Line 33, change "engine," to --engine;--

Line 34, delete "(B1)"

Line 37, delete "(37)";

Line 38, change "means (41)," to --means;--;

Line 39, delete "(B12)";

Line 45, change "selected," to --selected;--;

Line 46, delete "(6)";

Line 48, change "engine," to --engine;--;

Line 49, delete "(110)";

Line 51, delete "(B1)";

Line 54, change "mode," to --mode;--;

Line 56, delete "(111)";

Line 58, delete "(6)";

Line 60, delete "(110)";

Line 63, delete "(110)";

UNITED STATES PATENT AND TRADEMARK OFFICE
CERTIFICATE OF CORRECTION

PATENT NO. : 5,975,044

DATED : November 2, 1999

INVENTOR(S): KAMURA et al.

It is certified that error appears in the above-identified patent and that said Letters Patent are hereby corrected as shown below:

Column 14

Line 3, delete "(111);

Line 4, delete "(6)";

Line 10, delete "(111)";

Line 11, delete "(6)";

Line 14, delete "(6)";

Line 18, change "comprising" to --further comprising:--;

Line 19, delete "(122, 123, 124)";

Line 25, change "comprising" to --further comprising:--;

Line 29, delete "(122, 123, 124)";

Line 31, change "means;" to --means,--;

Line 33, delete "(110)";

Line 43, delete "(122, 123, 124)";

Line 44, delete "(41)";

Line 48, delete "(37)";

Line 53, delete "(110)";

Line 54, delete "(37)";

Line 58, delete "(122, 123, 124)";

Line 64, change "comprising" to --further comprising:--;

UNITED STATES PATENT AND TRADEMARK OFFICE
CERTIFICATE OF CORRECTION

PATENT NO. : 5,975,044

DATED : November 2, 1999

INVENTOR(S): KAMURA et al.

It is certified that error appears in the above-identified patent and that said Letters Patent are hereby corrected as shown below:

<u>Column 15</u>

Line 1, delete "(122, 123, 124)";

Line 6, delete "(110)";

Line 10, delete "(110)";

Line 16, delete "(122, 123, 124)";

Line 18, delete "(41)";

Line 21, delete "(110)";

Line 28, delete "(111)";

Line 29, delete "(6)";

Line 32, delete "(6)";

Line 37, delete "(5)";

delete "(15)";

Line 40, delete "(15)";

Line 41, delete "(6)";

Line 42, change "passage (5);" to --passage,--;

Line 44, delete "(111)";

delete "(6)";

Line 46, delete "(5)";

Line 50, delete "(111)";

Line 51, delete "(6)";

UNITED STATES PATENT AND TRADEMARK OFFICE
CERTIFICATE OF CORRECTION

PATENT NO. : 5,975,044

DATED : November 2, 1999

INVENTOR(S): KAMURA et al.

It is certified that error appears in the above-identified patent and that said Letters Patent are hereby corrected as shown below:

Column 15 *(cont'd)*

Line 54, delete "(6)";

Line 60, delete "(37)";

Line 63, change "driver;" to --driver,--;

Line 65, delete "(6)";

Column 16

Line 2, delete "(6)";

Line 5, delete "(37)";

Line 7, delete "(6)";

Line 12, delete "(6)";

Line 16, delete "(111)";

Line 26, change "comprising" to --further comprising:--;

Line 27, delete "(44)";

Line 29, delete "(B12)";

Line 32, delete "(44)";

Line 35, delete "(37)";

Line 44, change "stroke;" to --stroke,--;

Line 46, delete "(37)";

Line 48, change "engine," to --engine;--;

UNITED STATES PATENT AND TRADEMARK OFFICE
CERTIFICATE OF CORRECTION

PATENT NO. : 5,975,044

DATED : November 2, 1999

INVENTOR(S): KAMURA et al.

It is certified that error appears in the above-identified patent and that said Letters Patent are hereby corrected as shown below:

Column 16 *(cont'd)*

Line 49, delete "(41)";

Line 51, change "engine," to --engine;--;

Line 52, delete "(B1)";

Line 55, delete "(37)";

Line 56, change "means (41)," to --means;--;

Line 57, delete "(B12)";

Line 64, change "selected," to --selected;--;

Line 65, delete "(6)";

Line 67, change "engine," to --engine;--

Column 17

Line 1, delete "(110)";

Line 3, delete "(B1)";

Line 4, change "amount," to --amount;--;

Line 5, delete "(110)";

Line 7, change "mode, and" to --mode; and--;

UNITED STATES PATENT AND TRADEMARK OFFICE
CERTIFICATE OF CORRECTION

PATENT NO. : 5,975,044

DATED : November 2, 1999

INVENTOR(S): KAMURA et al.

It is certified that error appears in the above-identified patent and that said Letters Patent are hereby corrected as shown below:

<u>Column 18</u>

Line 1, delete "(111)";

Line 3, delete "(6)";

Line 5, delete "(110)".

Signed and Sealed this

Fourteenth Day of November, 2000

Attest:

Q. TODD DICKINSON

*Attesting Officer*  *Director of Patents and Trademarks*